US012687711B2

(12) United States Patent
Xia et al.

(10) Patent No.: US 12,687,711 B2
(45) Date of Patent: Jul. 21, 2026

(54) MICROSCOPIC IMAGING SYSTEMS

(71) Applicant: SHANGHAI RUIYU BIOTECH CO., LTD., Shanghai (CN)

(72) Inventors: Haohan Xia, Shanghai (CN); Wenlong Zhai, Shanghai (CN)

(73) Assignee: SHANGHAI RUIYU BIOTECH CO., LTD., Shanghai (CN)

( * ) Notice: Subject to any disclaimer, the term of this patent is extended or adjusted under 35 U.S.C. 154(b) by 326 days.

(21) Appl. No.: 18/448,120

(22) Filed: Aug. 10, 2023

(65) Prior Publication Data

US 2024/0053595 A1 Feb. 15, 2024

(30) Foreign Application Priority Data

Aug. 11, 2022 (CN) .......................... 202210961470.9

(51) Int. Cl.
G02B 21/00 (2006.01)
G02B 21/24 (2006.01)
G02B 21/26 (2006.01)
G02B 21/36 (2006.01)

(52) U.S. Cl.
CPC ........... *G02B 21/26* (2013.01); *G02B 21/242* (2013.01); *G02B 21/362* (2013.01)

(58) Field of Classification Search
CPC .... G02B 21/26; G02B 21/242; G02B 21/362; G02B 21/0008; G02B 21/34; G02B 21/365; G01N 21/01; G01N 21/84; Y02P 90/02
See application file for complete search history.

(56) References Cited

U.S. PATENT DOCUMENTS

| | | | | |
|---|---|---|---|---|
| 4,903,534 A | * | 2/1990 | Kane | G01N 3/56 |
| | | | | 73/865.9 |
| 7,729,048 B2 | * | 6/2010 | Takeuchi | G02B 21/241 |
| | | | | 359/383 |
| 2003/0173509 A1 | * | 9/2003 | Ito | G02B 21/362 |
| | | | | 250/235 |
| 2018/0231752 A1 | * | 8/2018 | Putman | G06V 20/693 |
| 2020/0371334 A1 | * | 11/2020 | Molnar | G02B 21/241 |
| 2021/0223527 A1 | * | 7/2021 | Meyer | G02B 21/16 |

FOREIGN PATENT DOCUMENTS

| | | |
|---|---|---|
| CN | 104459965 B | 12/2017 |
| CN | 110764245 A | 2/2020 |
| CN | 218239794 U | 1/2023 |
| KR | 100498275 B1 | 6/2005 |

OTHER PUBLICATIONS

The Extended European Search Report in European Application No. 23190775.9 mailed on Jan. 5, 2024, 9 pages.

* cited by examiner

*Primary Examiner* — Mustak Choudhury
(74) *Attorney, Agent, or Firm* — Metis IP LLC

(57) ABSTRACT

The present disclosure provides a microscopic imaging system. The microimaging system includes a sample platform control structure and/or a platform mechanism for the microscopic imaging system. The sample platform control structure includes a base, an X platform, an X platform moving mechanism, a sample platform, a sample platform moving mechanism, a primary guide rail, and a secondary guide rail. The platform mechanism for the microscopic imaging system includes the sample platform control structure and a Y platform, a Y platform moving mechanism, a Z platform, a Z platform moving mechanism, and an imaging device.

20 Claims, 11 Drawing Sheets

100

100

MICROSCOPIC IMAGING SYSTEMS

CROSS-REFERENCE TO RELATED APPLICATIONS

This application claims priority to Chinese Patent Application No. 202210961470.9 filed on Aug. 11, 2022, the entire contents of which are hereby incorporated by reference.

TECHNICAL FIELD

The present disclosure relates to the technical field of imaging device, and in particular to microscopic imaging systems.

BACKGROUND

In the application of microscopic observation, the mode of manual focusing or automatic focusing is usually used to carry out imaging observation. The manual focusing is low cost, but it relies on experience and has poor stable. The automatic focusing relies on complex control structures and algorithms, and a space required for focusing is relatively large, resulting in bulky equipment and high cost. In addition, the micromanipulation requires on-site operation and processing by the experimenter, which is time-consuming and laborious, and the experience is poor.

Therefore, it is desired to provide a microscopic imaging system capable of achieving clear imaging in a simpler and more convenient manner.

SUMMARY

One embodiment of the present disclosure provides a sample platform control structure. The sample platform control structure includes a base, an X platform, an X platform moving mechanism, a sample platform, a sample platform moving mechanism, a primary guide rail, and a secondary guide rail. The sample platform is arranged on the X platform. The sample platform is configured to carry a sample carrying device. The sample platform moving mechanism is configured to drive the sample platform to move relative to the X platform via the primary guide rail. The X platform moving mechanism is configured to drive the X platform to move relative to the base via the secondary guide rail. An effective stroke of the primary guide rail is L1, an effective stroke of the secondary guide rail is L2, a length of the secondary guide rail is L3, and the L1, the L2, and the L3 meet a condition: $L3 < L1 + L2 < 2L3$.

In some embodiments, the primary guide rail and the secondary guide rail have different accuracies. The primary guide rail is a linear guide rail, and the secondary guide rail is a cross guide rail.

In some embodiments, the X platform moving mechanism and the sample platform moving mechanism have different control accuracies.

In some embodiments, the X platform moving mechanism includes an X platform driving portion. The X platform driving portion is arranged on the base, and the X platform driving portion is drivably connected to the X platform. The secondary guide rail is arranged between the X platform and the base, and the X platform driving portion is configured to drive the X platform to move relative to the base via the secondary guide rail.

In some embodiments, the sample platform moving mechanism includes a sample platform driving portion. The sample platform driving portion is arranged on the sample platform. The primary guide rail is arranged between the X platform and the sample platform. The sample platform driving portion is configured to drive the sample platform to move relative to the X platform via the primary guide rail.

In some embodiments, the sample platform moving mechanism further includes a position sensor, and the position sensor is configured to detect that the sample platform reaches a set position.

One of the embodiments of the present disclosure provides a control system for the sample stage control structure as described above. The control system includes a controller. The controller is configured to perform a method for controlling the sample platform control structure. The method includes controlling a movement of the sample platform through the sample platform moving mechanism when mounting/replacing a sample on the sample platform; and controlling a movement of the X platform through the X platform moving mechanism when microscopic imaging the sample.

One embodiment of the present disclosure provides a platform mechanism for a microscopic imaging system. The platform mechanism includes the sample platform control structure as described above.

In some embodiments, the platform mechanism further includes a Y platform and a Y platform moving mechanism. The Y platform is slidingly connected to the base. The Y platform moving mechanism is configured to drive the Y platform to move along a Y axis relative to the base.

In some embodiments, the X platform and the Y platform are not in a same plane.

In some embodiments, the platform mechanism further includes a Z platform and a Z platform moving mechanism. The Z platform and the Z platform moving mechanism are arranged on the Y platform. The Z platform is arranged perpendicularly to the Y platform. The Z platform moving mechanism is configured to drive the Z platform to move along a Z axis.

In some embodiments, the platform mechanism further includes an imaging device. The imaging device is arranged on the Z platform, and the imaging device is arranged below the sample carrying device.

One embodiment of the present disclosure provides a microscopic imaging system comprising the sample platform control structure as described above.

One embodiment of the present disclosure provides a microscopic imaging system comprising a platform mechanism for the microscopic imaging system as described above.

In some embodiments, the X platform moving mechanism, the Y platform moving mechanism, and the Z platform moving mechanism include sensors respectively. The sensors are configured to detect displacements of the X platform, the Y platform, and the Z platform, respectively.

In some embodiments, the Y platform moving mechanism includes a Y platform driving portion. The Y platform is provided with a slider. The base is provided with a slide rail. The Y platform driving portion drives the Y platform to move along the Y axis relative to the base through a cooperation between the slider and the slide rail.

In some embodiments, the Z platform moving mechanism includes a Z platform driving portion and a first mounting block. The Z platform driving portion is fixed to the first mounting block. The Z platform is slidably arranged on the first mounting block. The Z platform driving portion drives the Z platform to move relative to the first mounting block.

In some embodiments, the Z platform moving mechanism further includes a second mounting block and a connection plate. The second mounting block is fixed to the Y platform. The first mounting block is slidably arranged on the second mounting block along the Z axis. The connection plate is fixedly arranged on the first mounting block, one side of the connection plate is connected to the second mounting block by a first elastic component, and the other side of the connection plate is provided with a screw hole for a lens of the imaging device to pass through. The first mounting block is arranged between the imaging device and the first elastic component.

In some embodiments, the microscopic imaging system further includes a follower structure and a follower frame. The Z platform and the Z platform moving mechanism are arranged on the follower structure. The follower frame is arranged on the Y platform. The follower structure is movably connected to the follower frame. A top end of the follower structure is abutted against a bottom surface of the sample carrying device. The follower structure is configured to maintain a distance between the imaging device and the bottom surface of the sample carrying device.

In some embodiments, the microscopic imaging system further includes a fixing device. The fixing device is in rolling contact with the sample carrying device.

In some embodiments, the sample platform is provided with a guide block. The fixing device is capable of being rolled along the guide block.

In some embodiments, an extension direction of the guide block is in a same direction as a rolling direction of the fixing device. The guide block has a trapezoidal shape in a direction perpendicular to the extension direction of the guide block.

In some embodiments, both a count of the guide block and a count the fixing device are two, the guide block and the fixing device are arranged on two sides of the sample carrying device.

In some embodiments, the microscopic imaging system further includes a guide shaft. The guide shaft is vertically arranged on the base or the X platform. The fixing device includes a press block, and the guide shaft movably passes through the press block. An end of the guide shaft away from the base is provided with a locking member. The guide shaft is sleeved with a second elastic component, one end of the second elastic component is abutted against the press block, and the other end of the second elastic component is abutted against the locking member.

In some embodiments, the guide shaft is a telescopic shaft capable of telescoping.

In some embodiments, the microscopic imaging system further includes a pressure sensor configured to detect a pressure of the second elastic component.

In some embodiments, the microscopic imaging system further includes a control system. The control system includes a communication device and a controller. The communication device is configured to receive an instruction. The controller is configured to control, according to the instruction, movements of the sample platform, the X platform, the Y platform, and the Z platform, respectively, and an imaging of the imaging device.

One embodiment of the present disclosure provides a method for controlling a microscopic imaging system. The method is performed by the microscopic imaging system. The method includes receiving a movement instruction; and controlling a movement of the sample platform, the X platform, the Y platform, and/or the Z platform based on the movement instruction.

In some embodiments, the method further includes receiving an imaging instruction; and controlling the imaging device to image based on the imaging instruction.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
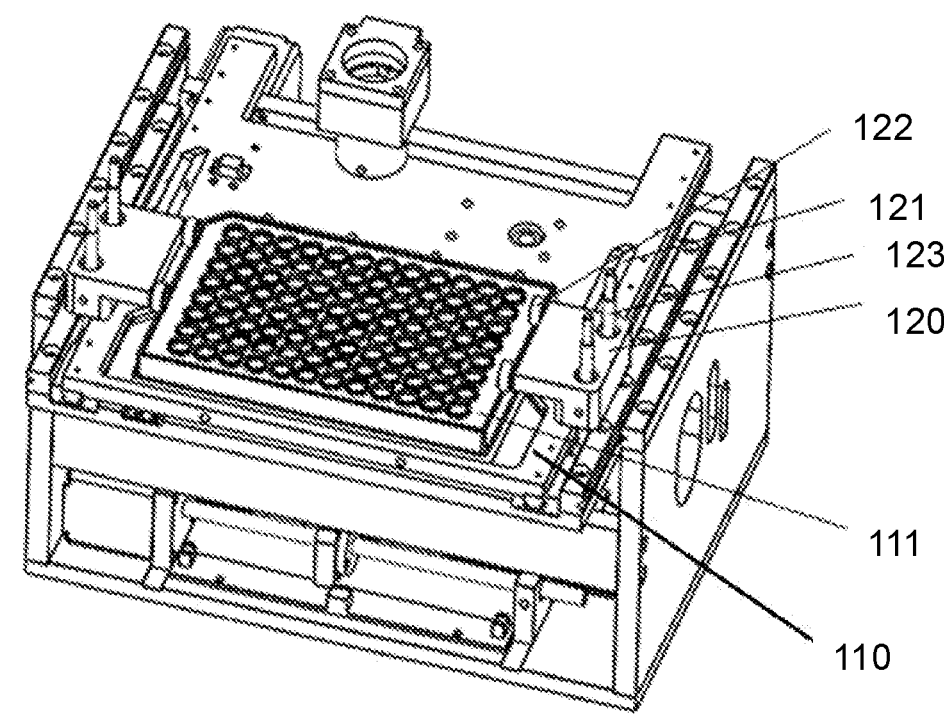
FIG. 1 is a schematic diagram illustrating a structure of a microscopic imaging system according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements do not constitute an exclusive list, and the method or device may also include other steps or elements.

A microscopic imaging system refers to a system that photographs and images a sample through an imaging device. In some embodiments, the imaging device may include a microscope. By adjusting an imaging position of an objective lens of the microscope, an image formed by the objective lens is located on outside of a front focus of an eyepiece, which is enlarged by the eyepiece to obtain a secondary enlarged upright real, and when a light source is sufficiently strong, a photoelectric element of a camera or a video camera would perform photosensitive imaging. The microscopic imaging system combines microscope and camera technique, which enables an observation and an image acquisition of a microorganism that cannot be seen by human eyes, so as to store or further process the acquired image. In some embodiments, the imaging device may include a device capable of microscopic imaging (e.g., a microscopic camera, etc.).

Figure 2:
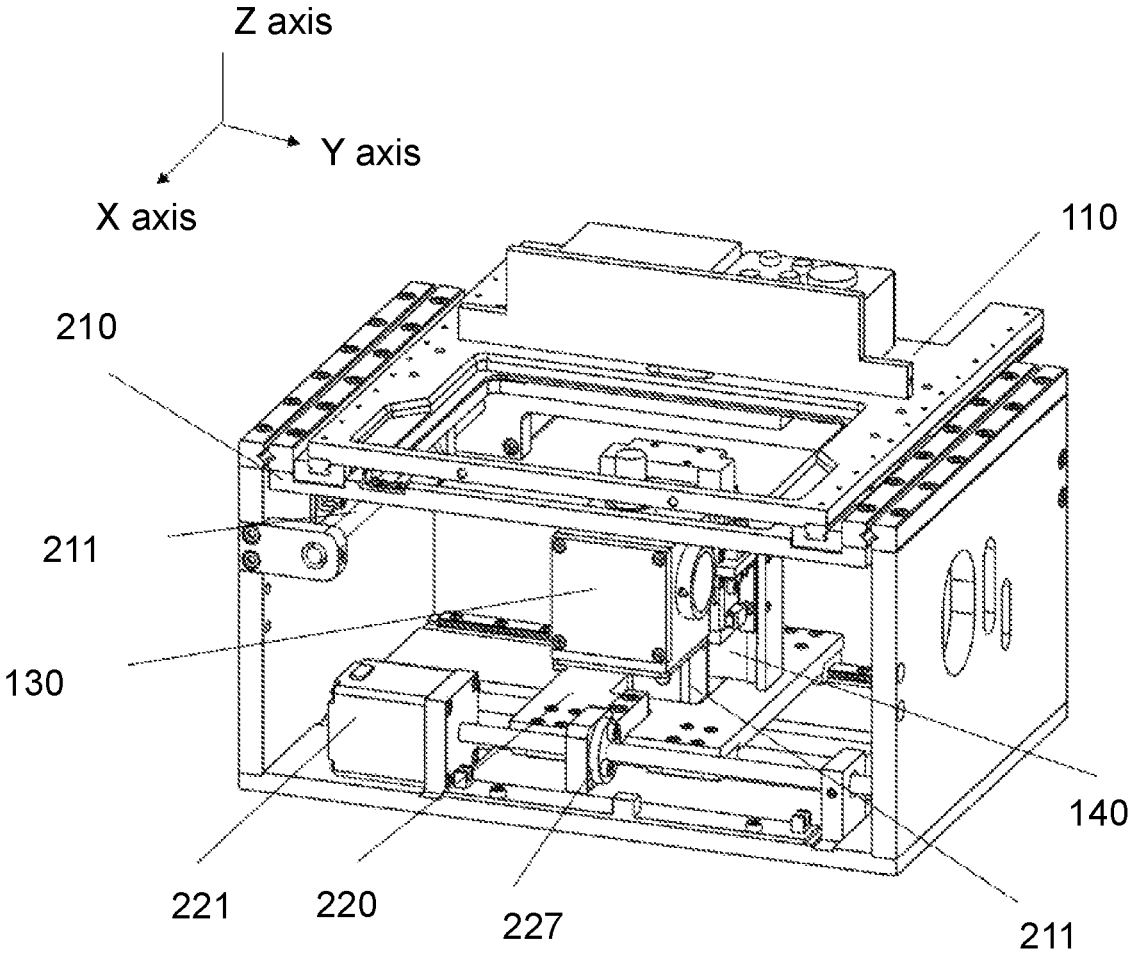
FIG. 2 is a schematic diagram illustrating a partial structure of a microscopic imaging system according to some embodiments of the present disclosure.
Figure 3:
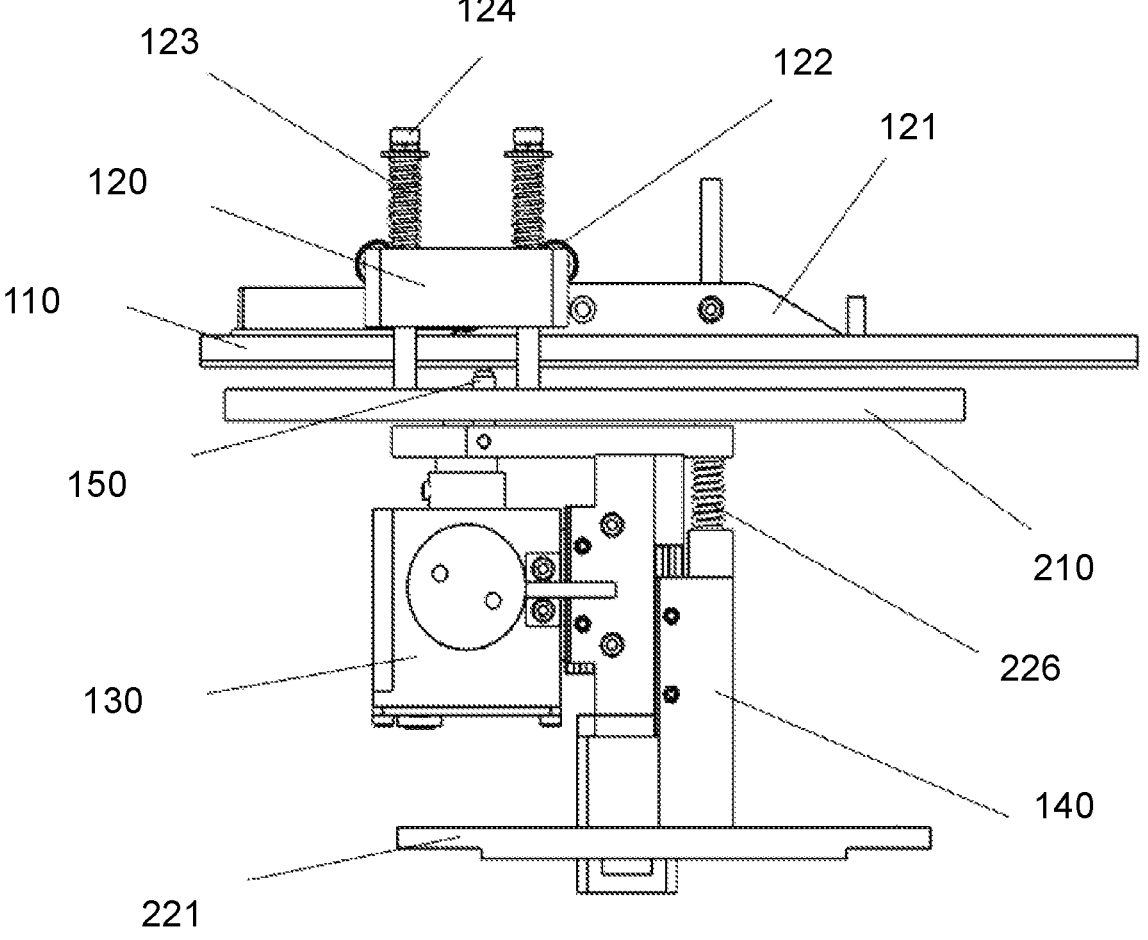
FIG. 3 is a schematic diagram illustrating a partial structure of a microscopic imaging system according to some embodiments of the present disclosure.

FIG. 1 is a schematic diagram illustrating a structure of a microscopic imaging system according to some embodiments of the present disclosure. FIG. 2 is a schematic diagram illustrating a partial structure of a microscopic imaging system according to some embodiments of the present disclosure. FIG. 3 is a schematic diagram illustrating a partial structure of a microscopic imaging system according to some embodiments of the present disclosure.

In some embodiments, as shown in FIGS. 1, 2, and 3, the microscopic imaging system 100 may include a sample platform 110, a fixing device, an imaging device 130, a follower structure 150, and a follower frame 140. In some embodiments, the sample platform 110 may be configured to carry a sample carrying device 111, and the fixing device may be configured to apply a downward pressure on the sample carrying device 111. The follower structure 150 and the follower frame 140 may be movably connected, and the imaging device 130 may be arranged on the follower structure 150, and a top of the follower structure 150 abuts against a bottom surface of the sample carrying device 111. The follower structure 150 may be configured to maintain a distance between the imaging device 130 and the bottom surface of the sample carrying device 111.

The sample platform 110 is a structure for adapting the sample carrying device 111. In some embodiments, the sample carrying device 111 may be fixedly assembled to the sample platform 110. In some embodiments, the sample platform 110 may be in a variety of structural forms, such as in a form of a horizontal platform.

The sample carrying device 111 refers to a material configured to carry a sample (e.g., a microorganism, etc.) in a biological experiment. In some embodiments, the sample carrying device 111 may include at least one of a sample plate, a counting plate, a multihole plate, a petri dish, etc.

The fixing device refers to a structure for applying a downward pressure to the sample carrying device 111 to restrict a position of the sample carrying device 111. In some embodiments, the fixing device may be arranged at a side of the sample carrying device 111 to achieve a function of applying the downward pressure on the sample carrying device 111, while a function of the sample carrying device 111 itself and a function of the microscopic imaging system 100 are not affected. In some embodiments, a count of the fixing devices may be one or more. For example, the fixing devices may be two, and the two fixing devices may be arranged on opposite sides of the sample carrying device 111 to apply the downward pressure to the sample carrying device 111 from two sides of the sample carrying device 111, respectively.

In some embodiments, the fixing device may be in rolling contact with the sample carrying device 111. In some embodiments, the fixing device may include a press block 120 and a press wheel.

Figure 4:
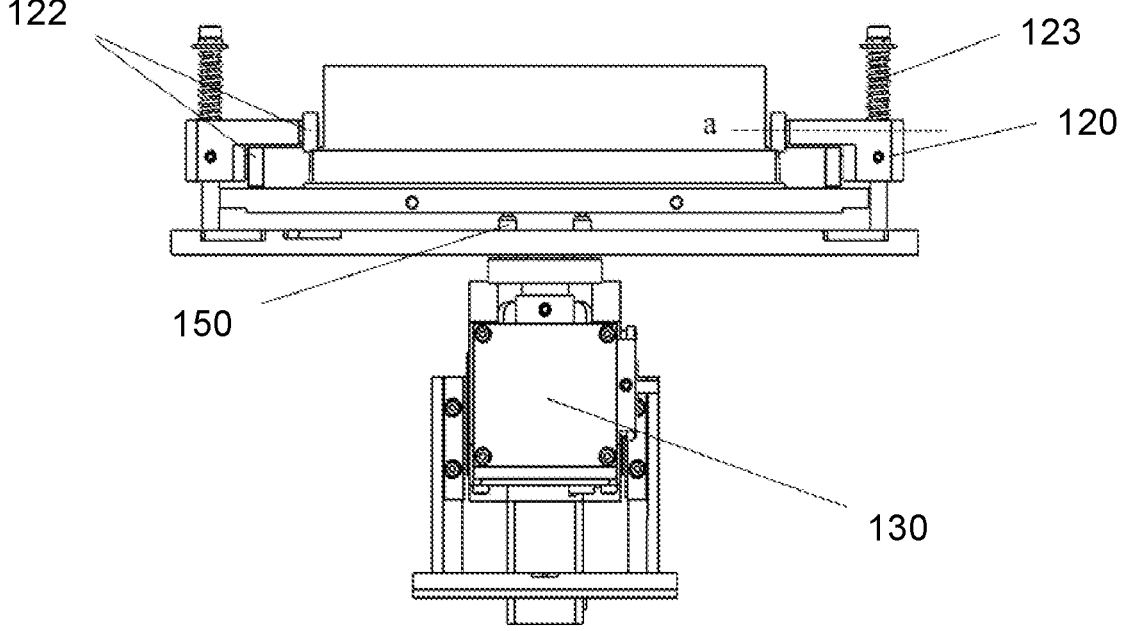
FIG. 4 is a left view of FIG. 3 according to some embodiments of the present disclosure.

FIG. 4 is a left view of FIG. 3 according to some embodiments of the present disclosure. In some embodiments, as shown in FIG. 4, a cross section of the press block 120 may be in a stepped shape, and a plurality of press wheels 122 may be provided on a stepped end surface of the press block 120. The stepped end surface of the press block 120 refers to a side of one end of the press block 120 that is in the stepped shape. As shown in FIG. 4, a side of the press block 120 is in the stepped shape. A step away from the sample platform 110 has a larger cross-sectional area than a step proximate to the sample platform 110, and both the step away from the sample platform 110 and the step proximate to the sample platform 110 are provided with a press wheel. An axis (a dashed line in FIG. 4) of each of the plurality of press wheels 122 may be parallel to the cross section of the press block 120, and the axis (the dashed line in FIG. 4) of each of the plurality of press wheels 122 may be parallel to the sample platform 110.

In some embodiments, the sample platform 110 may be provided with a guide block 121 along which the fixing device is capable of rolling. In some embodiments, the fixing device may include the plurality of press wheels 122, and the guide block 121 may be configured to guide movements of the press wheels. At least one of the plurality of press wheels 122 is capable of moving along the guide block 121, and the other of the plurality of press wheels 122 is capable of moving along the sample platform 110 and applying the downward pressure to the sample carrying device 111. In some embodiment, a count of press wheels arranged on an end surface of each press 120 may be three, two of the three press wheels are further away from the sample platform 110 in a vertical direction relative to the other of the three press wheels. The two press wheels of the three press wheels away from the sample platform 110 are capable of moving along the sample carrying device 111, and the other of the three press wheels is capable of moving along the guide block 121.

In some embodiments, an extension direction of the guide block 121 may be in a same direction as a rolling direction of the fixing device, and in a direction perpendicular to the extension direction of the guide block 121, the guide block 121 may be in a trapezoidal shape. In some embodiments, the guide block 121 may be in a shape of an isosceles trapezoid, a beveled surface of which may be used to guide the movements of the press wheels.

In some embodiments, both a count of the guide block 121 and a count of the press block 120 may be two. The guide block 121 and the press block 120 may be arranged on two sides of the sample carrying device 111. In some embodiments, the guide block 121 may cooperate with the press block 120 to realize the contact and separation between the press block 120 and the sample carrying device 111, so as to realize the assembly and disassembly of the sample carrying device 111.

In some embodiments, the microscopic imaging system 100 may also include a guide shaft and a base. In some embodiments, the guide shaft may be vertically arranged on the base. The guide shaft movably passes through the press block 120. In other embodiments, the guide shaft may also be vertically arranged on an X platform 210. In some embodiments, an end of the guide shaft away from the base may be provided with a locking member 124, and the guide shaft may be sleeved with a second elastic component 123. One end of the second elastic component 123 may be abutted against the press block 120, and the other end of the second elastic component 123 may be abutted against the locking member 124. In some embodiments, each press block 120 may correspond to one or more guide shafts. The press block 120 may move in a vertical direction along the guide shaft, and the press block 120 is capable of exerting a downward force on the sample carrying device 111 based on the action of the second elastic component 123.

In some embodiments, the press block 120 is capable of moving up and down along the guide shaft to adapt to the sample carrying device 111 of different thicknesses, which improves the assembly stability of the sample carrying device 111 and facilitates the realization of the microscopic imaging.

In some embodiments, when the sample platform moves, the guide block 121 may guide the press wheel to contact or separate from the sample carrying device 111 according to the position of the sample platform 110.

Merely by way of example, during the experiment, one press wheel relatively away from the sample platform 110 may be abutted against the sample carrying device 111, thereby restricting the position of the sample carrying device 111. When the experiment is over and the sample carrying device 111 needs to be withdrawn, the press wheel relatively close to the sample platform 110 may slide upward along an inclined surface of the trapezoidal guide block 121 so that the press wheel relatively away from the sample platform 110 gradually separates from the sample carrying device 111. After the press wheel relatively away from the sample platform 110 is completely separated from the sample carrying device 111, the press wheel relatively close to the sample platform 110 may slide down to the sample platform 110 from the inclined surface of the other end of the guide block 121. When the experiment starts, the assembly process of the sample carrying device 111 may be opposite to the withdrawal process of the sample carrying device 111, and the press wheel relatively close to the sample platform 110 may slide upward from the inclined surface of one end of the guide block 121, so that the press wheel relatively away from the sample platform 110 is lifted up to the top of the sample carrying device 111, and the press wheel relatively close to the sample platform 110 may slide downward from the inclined surface of the other end of the guide block 121, which makes the press wheel relatively away from the sample platform 110 gradually contact the sample carrying device 111, thereby realizing a force acting on the sample carrying device 111 from top to bottom.

In some embodiments, through the cooperation of the guide block 121 and the press wheel relatively close to the sample platform 110, the press wheel relatively away from the sample platform 110 may be lifted onto the sample carrying device 111 for compressing the sample carrying device 111. The above operations may make the press wheels relatively away from the sample platform 110 move away from above the sample carrying device 111 for the withdrawal of the sample carrying device 111. The sample carrying device 111 may be kept stable during the assembly or withdrawal of the sample carrying device 111.

In some embodiments, through the follower structure, an upward force may be applied to the sample carrying device 111 from bottom to top, and both sides of the sample carrying device 111 may apply a downward force from top to bottom through the press block 120. When the forces on the top and bottom of the sample carrying device 111 reach a balance, a follower focusing of the sample carrying device 111 may be achieved. In some embodiments, the forces on the top and bottom of the sample carrying device 111 may be balanced by adjusting the elasticity of the second elastic component 123 of the guide shaft. More descriptions of the follower structure please refer to the further description below.

In some embodiments, the guide shaft may be a telescopic shaft that is capable of expansion and contraction, and a length of the guide shaft may be changed through the expansion and contraction of the telescopic shaft. In some embodiments, the expansion and contraction of the telescopic shaft is capable of adjusting the elasticity of the second elastic component 123. For example, when the telescopic shaft is extended, the degree of compression of the second elastic component 123 may be reduced, and the elasticity of the second elastic component 123 may decrease; otherwise, the elasticity of the second elastic component 123 may increase.

In some embodiments, the microscopic imaging system 100 may also include a pressure sensor configured to detect a pressure of the second elastic component 123, e.g., a pressure exerted by the second elastic component 123 on the press block or the locking member. In some embodiments, the telescopic shaft is capable of automatically adjusting the length thereof based on a detection result of the pressure sensor. For example, when the pressure sensor detects that the pressure is small, and it is known from empirical data that the pressure may not make the press block press against the sample carrying device 111, the telescopic shaft may be controlled to shrink to increase a compression degree of the second elastic component 123, thereby increasing the pressure.

In some embodiments, the pressure-adjustable telescopic shaft is capable of achieving a stable contact with the sample carrying device 111 to improve the stability of the experiment.

Figure 5:
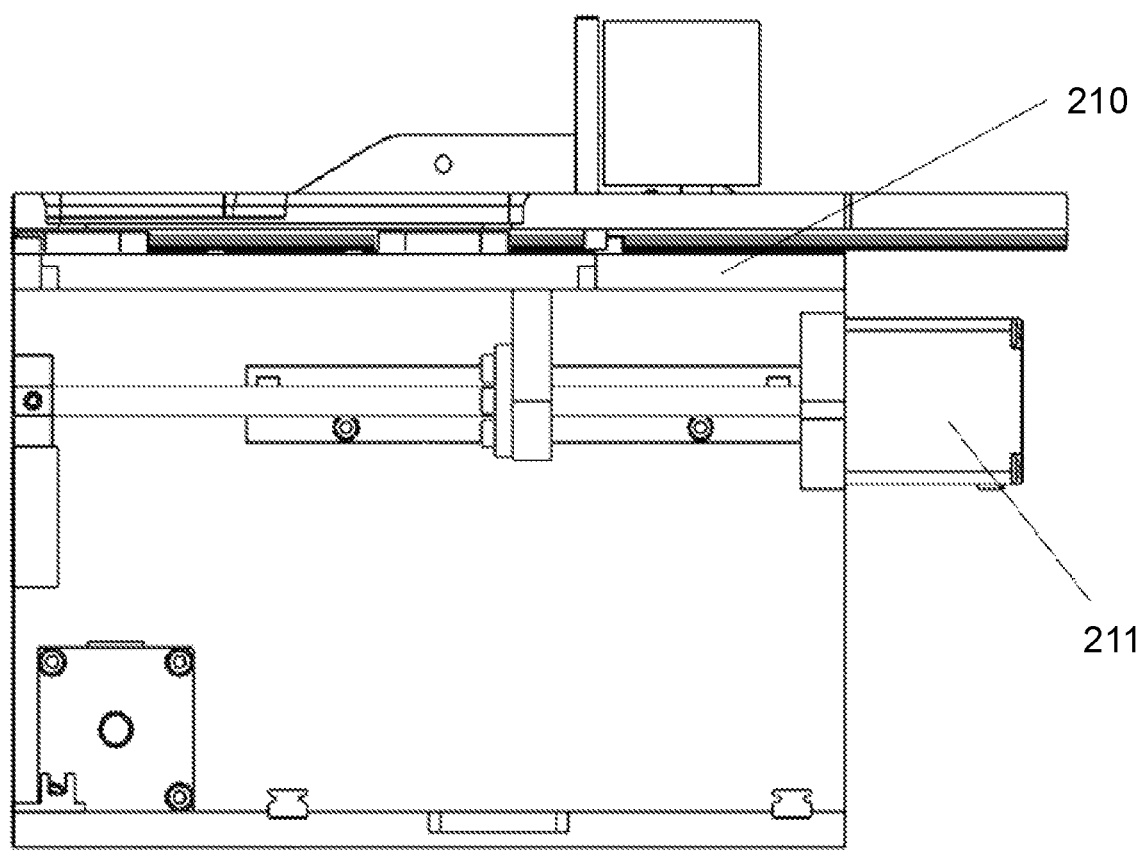
FIG. 5 is a schematic diagram illustrating a partial structure of a microscopic imaging system according to some embodiments of the present disclosure.
Figure 6:
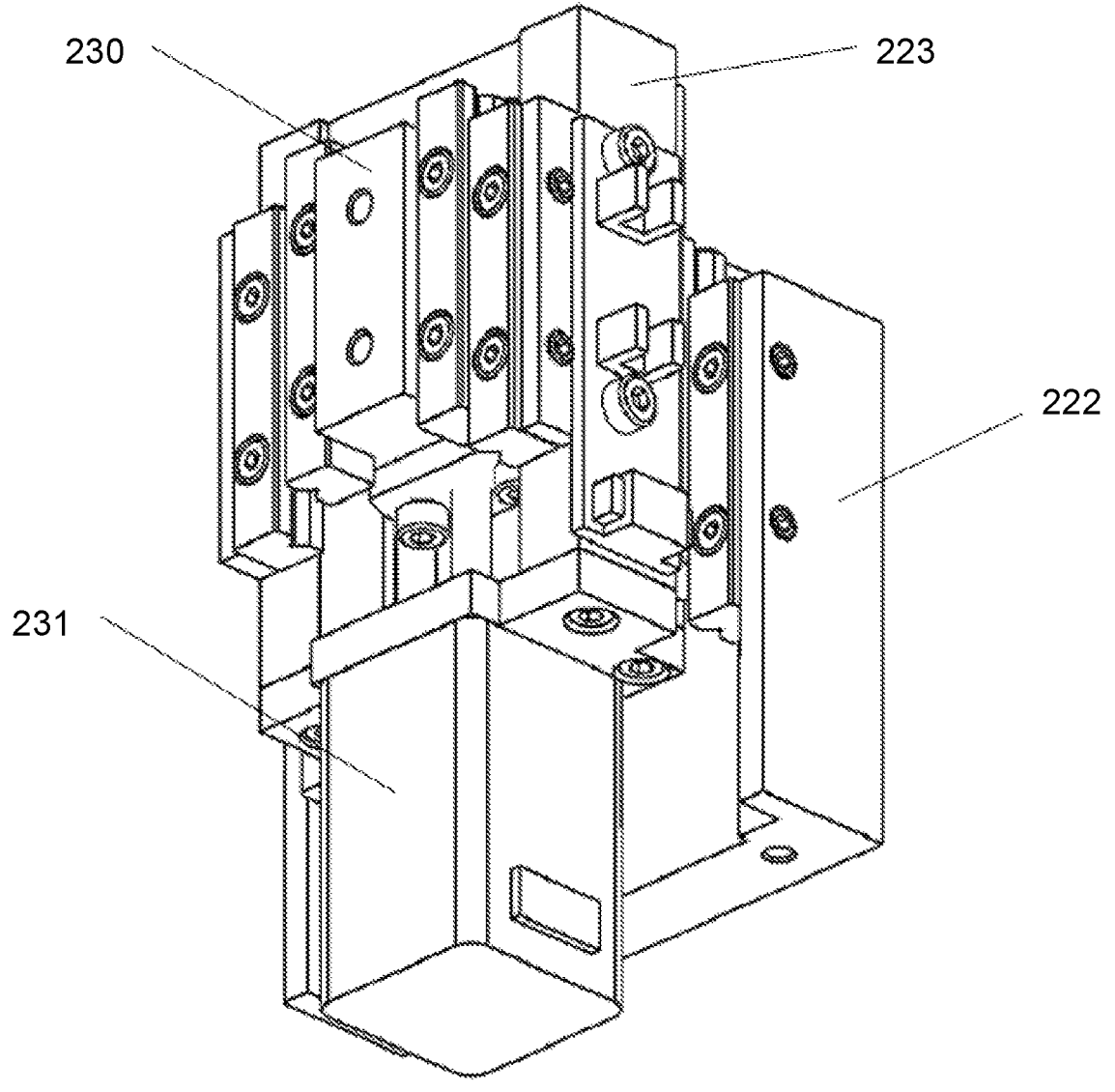
FIG. 6 is a schematic diagram illustrating a partial structure of a Z platform and a Z platform moving mechanism according to some embodiments of the present disclosure.

FIG. 5 is a schematic diagram illustrating a partial structure of a microscopic imaging system according to some embodiments of the present disclosure. FIG. 6 is a schematic diagram illustrating a partial structure of a Z platform and a Z platform moving mechanism according to some embodiments of the present disclosure.

As shown in FIGS. 2, 3, 5, and 6, some embodiments of the present disclosure provide a platform mechanism for the microscopic imaging system 100. The platform mechanism may include a sample platform control structure, and a Y platform 220, a Y platform moving mechanism, a Z platform 230, a Z platform moving mechanism, and an imaging device. The sample platform control structure may include a base, an X platform, an X platform moving mechanism, a sample platform, a sample platform moving mechanism, a primary guide rail, and a secondary guide rail. More descriptions of the sample platform control structure please refer to FIGS. 7, 8, and 9 and the descriptions thereof.

In some embodiments, the sample platform 110 may be arranged on the X platform 210, the X platform 210 may be slidably connected to the base, and the X platform moving mechanism may be configured to drive the X platform 210 to move along an X axis relative to the base. In some embodiments, the Y platform 220 may be slidably connected to the base, and the Y platform moving mechanism may be configured to drive the Y platform 220 along a Y axis relative to the base. In some embodiments, both the Z platform 230 and the Z platform moving mechanism may be arranged on the Y platform 220, and the Z platform moving mechanism may be configured to drive the Z platform 230 along a Z axis. In some embodiments, the imaging device 130 may be arranged on the Z platform 230.

In some embodiments, the X platform, Y platform, and Z platform are respectively driven by the X platform moving mechanism, the Y platform moving mechanism, and the Z platform moving mechanism, so that an image of the sample at any position on the sample carrying device 111 may be conveniently captured. Through the above operations, a distance between the imaging device 130 and the sample carrying device 111 may be adjusted in the Z-axis direction, so that the imaging device 130 and the sample carrying device 111 may maintain an optimal relative distance to achieve clear imaging.

In some embodiments, the sample platform 110 may be configured to carry the sample carrying device 111, and the imaging device 130 may be arranged below the sample carrying device 111. In some embodiments, the X platform moving mechanism may be configured to drive the X platform 210 to move along the X axis, thereby driving the sample carrying device 111 to move along the X axis. The Y platform moving mechanism may be configured to drive the Y platform 220 to move along the Y axis, thereby driving the imaging device 130 to move along the Y axis. The Z platform moving mechanism may be configured to drive the Z platform 230 to move along the Z axis, thereby driving the imaging device 130 to move along the Z axis.

In some embodiments, the microscopic imaging system 100 may further include a sample platform moving mechanism. The sample platform 110 is arranged on the X platform 210. The X platform moving mechanism may be configured to drive the X platform 210 to move relative to the base, and the sample platform moving mechanism may be configured to drive the sample platform 110 to move relative to the X platform 210.

In some embodiments, the sample carrying device 111 may move along the X axis, and the imaging device 130 may move along the Y axis and Z axis, which makes it possible to observe the sample at any position on the sample carrying device 111 through the imaging device 130, and to easily adjust a distance between the imaging device 130 and the bottom surface of the sample carrying device 111 (the imaging surface) to ensure clear imaging.

Figure 7:
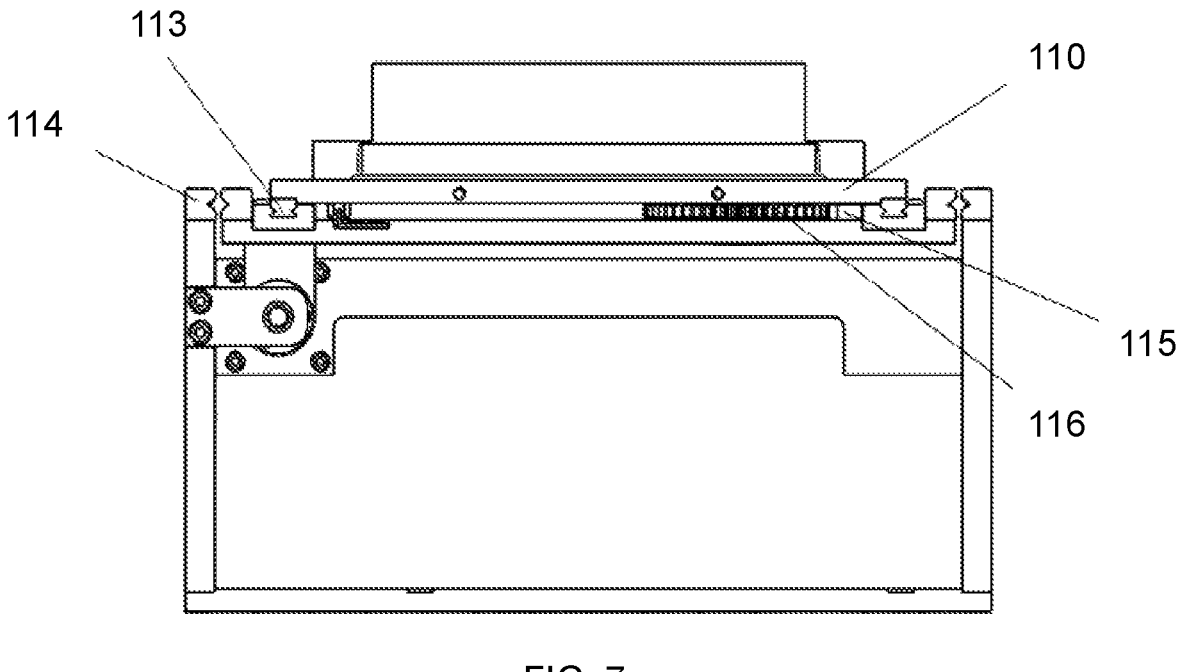
FIG. 7 is a schematic diagram illustrating a partial structure of a sample platform control structure according to some embodiments of the present disclosure.
Figure 8:
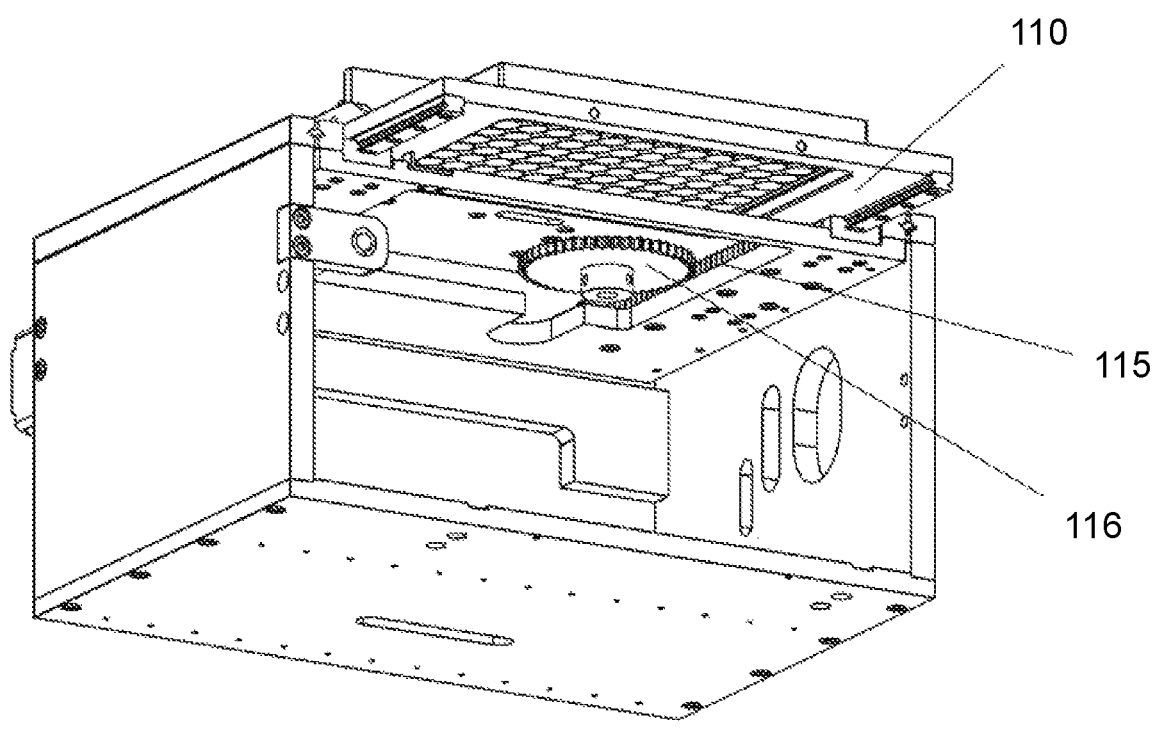
FIG. 8 is a schematic diagram illustrating a partial structure of a sample platform control structure according to some embodiments of the present disclosure.
Figure 9:
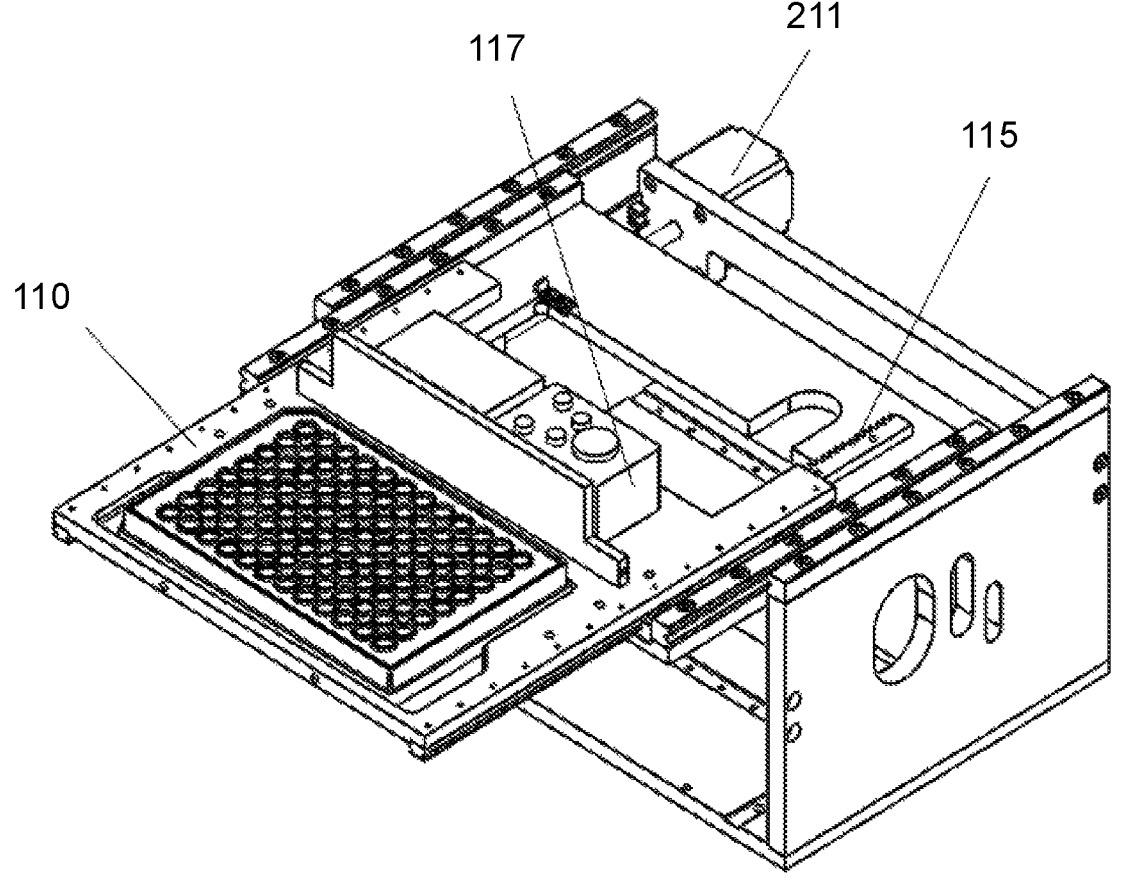
FIG. 9 is a schematic diagram illustrating a partial structure of a sample platform control structure according to some embodiments of the present disclosure.

Some embodiments of the present disclosure provide a sample platform control structure. In some embodiments, a relative movement of the X platform 210 and the sample platform 110 may be controlled by the sample platform control structure. FIG. 7 is a schematic diagram illustrating a partial structure of a sample platform control structure according to some embodiments of the present disclosure. FIG. 8 is a schematic diagram illustrating a partial structure of a sample platform control structure according to some embodiments of the present disclosure. FIG. 9 is a schematic diagram illustrating a partial structure of a sample platform control structure according to some embodiments of the present disclosure.

In some embodiments, the sample platform control structure may be understood to be a structure related to a sample platform and controlling the movement of the sample platform. As shown in FIGS. 7, 8, and 9, in some embodiments, the sample platform control structure may include a base, an X platform 210, an X platform moving mechanism, a sample platform 110, a sample platform moving mechanism, a primary guide rail 113, and a secondary guide rail 114. In some embodiments, the sample platform 110 may be arranged on the X platform 210. The sample platform moving mechanism may be configured to drive the sample platform 110 to move relative to the X platform 210 via the primary guide rail 113. The X platform moving mechanism may be configured to drive the X platform 210 to move relative to the base via the secondary guide rail 114.

In some embodiments, the primary guide rail 113 and the secondary guide rail 114 are arranged, so that the sample platform 110 and the X platform 210 may move along the primary guide rail 113 and the secondary guide rail 114, respectively, thereby ensuring the stability of the movement of the sample platform 110 and the X platform 210 and reducing workspace required for the equipment.

In some embodiments, the primary guide rail 113 and the secondary guide rail 114 may have different accuracies. In a specific embodiment, the movement of the sample platform 110 may be mainly used for mounting or dismounting the sample carrying device 111, etc., and the movement of the X platform 210 may be used for controlling a shooting field of view during the microscopic imaging process. Thus, the secondary guide rail 114 for driving the movement of the X platform 210 may have a higher accuracy compared to the primary guide rail 113 for driving the movement of the sample platform 110. In some embodiments, an effective stroke of the primary guide rail 113 may be L1, an effective stroke of the secondary guide rail 114 may be L2, and a length of the secondary guide rail 114 may be L3. L1, L2 and L3 may meet a condition: $L3 < L1 + L2 < 2L3$. For a movement in the X-axis direction, if only one guide rail is arranged, the guide rail needs to be of a higher accuracy in order to meet needs of the microscopic imaging, and accordingly, the guide rail has a longer length and occupies a larger space. For example, an effective stroke of the guide rail may be $L4 = L1 + L2$, in order to achieve such an effective stroke, the length of the guide rail may be much larger than 2L3. Thus, in some embodiments of the present disclosure, the primary guide rail 113 and the secondary guide rail 114 with different accuracies are provided, which greatly saves space relative to a single guide rail.

Merely by way of example, the accuracy requirement of the secondary guide rail 114 is relatively high, and a cross guide rail may be used in conjunction with a stepping drive part to achieve the movement of the X platform 210 relative to the base, thereby achieving higher accuracy switching of the imaging field of view.

Merely by way of example, the accuracy requirement of the primary guide rail 113 is relatively low, and a turbo reduction drive part may be used in conjunction with a linear guide rail to achieve the movement of the sample platform 110 relative to the X platform 210, thereby saving space and reducing equipment costs.

In some embodiments, the primary guide rail 113 may be a linear guide rail and the secondary guide rail 114 may be a cross guide rail.

In a specific embodiment, the cross guide rail may be arranged between the X platform 210 and the base, and the X platform moving mechanism may include an X platform driving portion 211 that drives the X platform 210 to move along the cross guide rail relative to the base.

In a specific embodiment, the primary guide rail 113 may further include a gear 116 and a rack 115, the sample platform 110 may be provided with a sample platform driving portion 117, and the rack 115 may be arranged on the X platform 210. A rotary shaft of the sample platform driving portion 117 may be connected to the gear 116, and the gear 116 may cooperate with the rack 115 such that the sample platform driving portion 117 may control the sample platform 110 to move along the linear guide rail relative to the X platform.

In some embodiments, based on the requirements of the microscopic imaging system 100, different control accuracies for the movement in the X-axis direction may be set. In some embodiments, the X platform moving mechanism and the sample platform moving mechanism may have different control accuracies. For example, the sample platform 110 may have a relatively low accuracy when used to mount or replace the sample carrying device 111, and a relatively high accuracy when used to photograph a sample.

In some embodiments, the X platform moving mechanism may have a high control accuracy, and the setting and control of a moving path of the X platform 210 and a moving speed of the X platform 210 may be realized by the control system, so as to realize the control of the photographing field of view of the imaging device 130.

In some embodiments, the sample platform moving mechanism may have a relatively low control accuracy. The control of the moving speed of the sample platform 110 may be realized by the control system. The control system is capable of moving the sample platform 110 to the outside relative to the microscopic imaging system 100 (i.e., moving the sample platform 110 so that a projection of the sample platform 110 on a horizontal plane does not coincide with projections of other parts of the microscopic imaging system 100 on the horizontal plane). The control system is capable of carrying out the mounting and replacement of the sample carrying device 111, feeding the sample carrying device 111 to a photographing position, etc.

Merely by way of example, the sample platform 110 and the X platform 210 may move along the primary guide rail 113 and the secondary guide rail 114, respectively, and the sample platform 110 may be pushed out through the primary guide rail 113 for mounting the sample carrying device 111. After the sample carrying device 111 is mounted, the sample platform 110 is pushed back and fed to the initial photographing position, and then the position of the X platform may be moved through the secondary guide rail 114 to further adjust the photographing field of view of the imaging device 130 to adjust the sample to an optimal photographing position. By setting the primary guide rail 113 and the secondary guide rail 114 to move the sample platform 110 and the X platform 210, respectively, the space can be effectively saved compared to a single X-axis direction movement equipment. In addition, the setting of different accuracies can maximize the efficiency.

In some embodiments, the X platform moving mechanism may include an X platform driving portion 211. The X platform driving portion 211 may be arranged on the base, and the X platform driving portion 211 may be drivably connected to the X platform 210. The secondary guide rail 114 may be arranged between the X platform 210 and the base, and the X platform driving portion 211 may drive the X platform 210 to move relative to the base via the secondary guide rail 114.

In a specific embodiment, a cross guide (e.g., a cross roller guide, etc.) may be arranged between the X platform 210 and the base, and the X platform driving portion 211 may drive the X platform 210 to move relative to the base via the cross guide.

In some embodiments, the sample platform moving mechanism may include a sample platform driving portion 117. The sample platform driving portion 117 may be arranged on the sample platform 110, and the primary guide rail 113 may be arranged between the X platform 210 and the sample platform 110. The sample platform driving portion 117 may drive the sample platform 110 to move relative to the X platform 210 via the primary guide rail 113.

In a specific embodiment, a linear guide rail may be arranged between the X platform 210 and the sample platform 110. At the same time, the X platform 210 may be provided with the rack 115, and the rotary shaft of the sample platform driving portion 117 may be connected with the gear 116. The gear 116 may be cooperated with the rack 115, so that the sample platform driving portion 117 drives the sample platform 110 to move relative to the X platform 210.

In some embodiments, the sample platform moving mechanism may further include a position sensor. The position sensor may be configured to detect that the sample platform 110 reaches a set position to improve the accuracy of controlling the moving position of the sample platform 110. For example, the position sensor may detect that the sample platform 110 moves to a position for assembling the sample carrying device 111 or withdrawing/disassembling the sample carrying device 111, thereby achieving the assembly and disassembly of the sample carrying device 111. As another example, the position sensor may detect that the sample platform 110 moves to a preset photographing field of view where the sample is located in the imaging device 130, thereby facilitating a subsequent sample image acquisition. In some embodiments, the set position may be a position where the sample carrying device 111 is mounted and ready for imaging. A relative position between the sample platform 110 and the X platform 210 remains unchanged during the imaging process. By mounting the position sensor at the set position, the influence of the accuracy error of the sample platform moving mechanism on the imaging may be avoided.

Some embodiments of the present disclosure also provide a control system for a sample platform control structure. In some embodiments, the control system may include a controller, and the controller may be configured to perform a method for controlling the sample platform control structure. The method may include controlling, through the sample platform moving mechanism, the sample platform 110 to move when mounting or replacing a sample on the sample platform 110; and controlling, through the X platform moving mechanism, the X platform 210 to move when microscopic imaging the sample. The sample platform control structure and the control system for the sample platform control structure may cooperate to form a complete control device. Under the control of the control system, the sample platform control structure may automatically complete the mounting or replacement of the sample platform and the sample imaging function.

In some embodiments, for the mounting or replacement of the sample carrying device on the sample platform 110, the accuracy requirement is not high, as long as the mounting or replacement of the sample carrying device 111 may be realized. As a result, the sample platform moving mechanism may have a relatively low accuracy in order to save costs. In some embodiments, when the microscopic imaging of the sample requires the imaging device 130 to capture a clear image of the sample at a specified position, the X platform moving mechanism needs to have a high accuracy.

In some embodiments, the microscopic imaging system 100 may include the sample platform control structure in any embodiment of the present disclosure.

In some embodiments, as shown in FIG. 2, the Y platform moving mechanism may include a Y platform driving portion 221. The Y platform 220 may be provided with a slider, the base may be provided with a slide rail, and the Y platform 220 may be provided with a screw nut 227 that cooperates with a rotary shaft of the Y platform driving portion 221. The Y platform driving portion 221 drives the Y platform 220 to move along the Y axis relative to the base through the cooperation of the slider and the slide rail.

In some embodiments, by arranging the X platform 210 capable of moving in the X-axis direction and the Y platform 220 capable of moving in the Y-axis direction, the movement of the equipment in the XY plane is realized. Compared with the XY combined platform, the above operations results in a smaller work space required for the movement of the equipment, thus saving space and reducing the size of the equipment.

Figure 11:
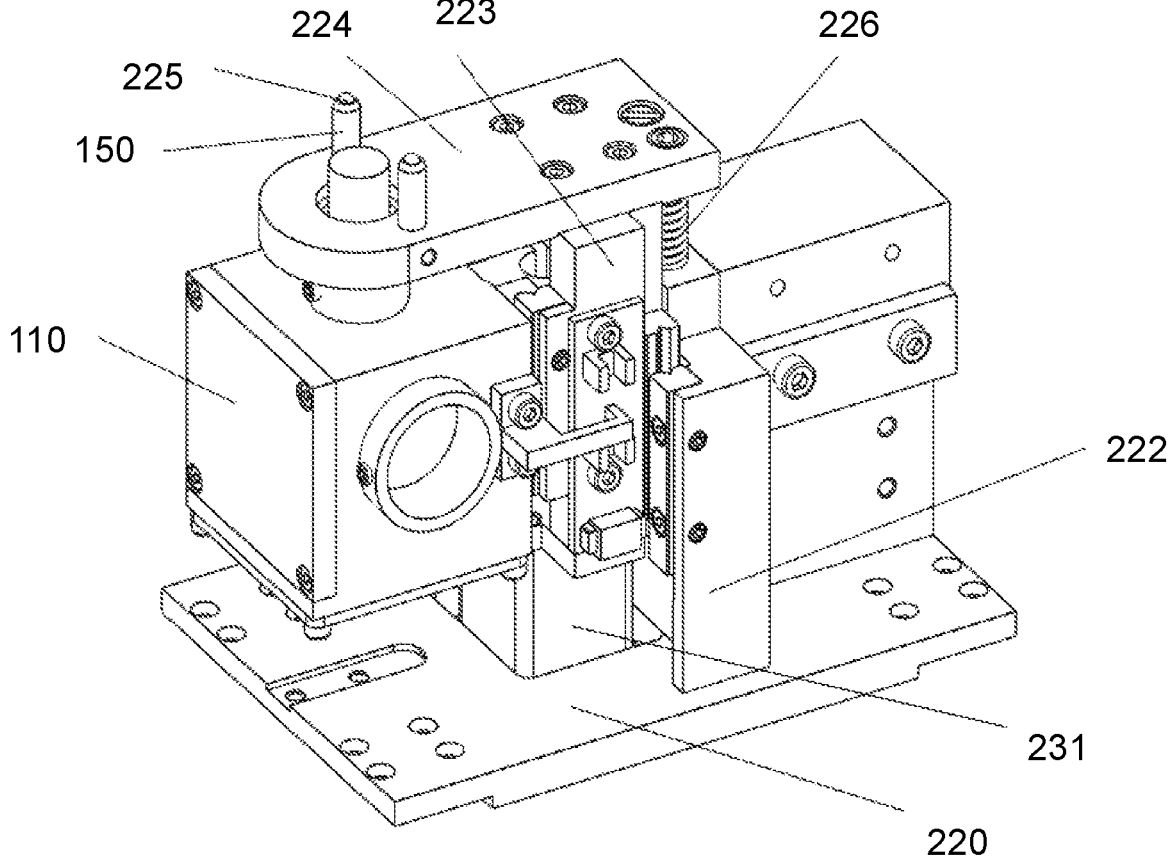
FIG. 11 is a schematic diagram illustrating the mounting of an imaging device according to some embodiments of the present disclosure.

In some embodiments, as shown in FIG. 6, the Z platform moving mechanism may include a Z platform driving portion 231 and a first mounting block 223 (as shown in FIG. 11). The Z platform driving portion 231 is fixed to the first mounting block 223, the Z platform 230 is slidably arranged on the first mounting block 223, and the Z platform driving portion 231 drives the Z platform 230 to move relative to the first mounting block 223. In a specific embodiment, the Z platform 230 may be provided with a slider, and the first mounting block 223 may be provided with a corresponding slide rail to achieve the sliding arrangement of the Z platform 230 relative to the first mounting block 223.

In some embodiments, the X platform moving mechanism, the Y platform moving mechanism, and the Z platform moving mechanism may respectively include sensor, such as, a displacement sensor, an angle sensor, etc. In some embodiments, the sensor (e.g., the displacement sensor) may be mounted on the X platform 210, the Y platform 220, and the Z platform 230 for detecting a displacement of the X platform 210, the Y platform 220, and the Z platform 230, respectively. In a specific embodiment, the displacement sensor may detect positions before and after movements of the X platform 210, the Y platform 220, and the Z platform 230, and feedback the detected position information to the control system to achieve the accurate knowledge and precise control of the movement positions of the X platform 210, the Y platform 220, and the Z platform 230.

Figure 10:
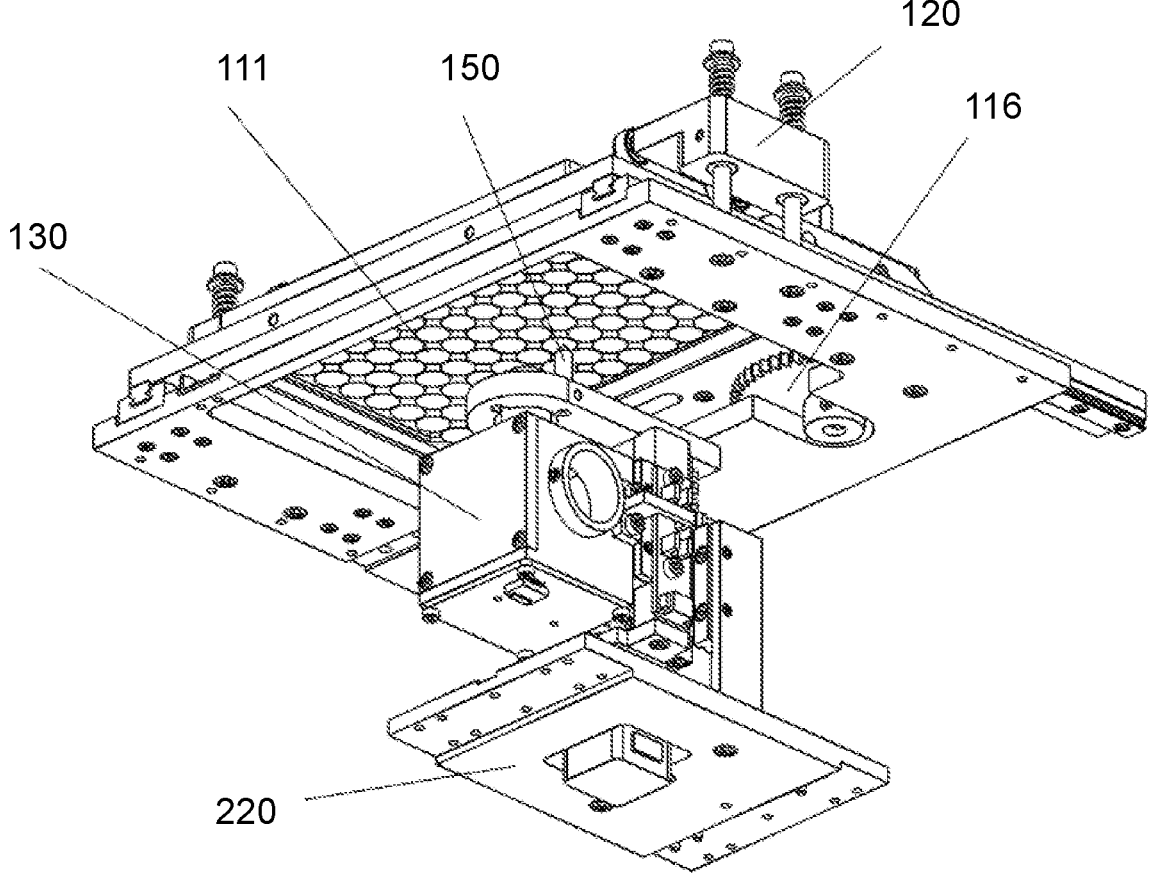
FIG. 10 is a schematic diagram illustrating a partial structure of a microscopic imaging system according to some embodiments of the present disclosure.

FIG. 10 is a schematic diagram illustrating a partial structure of a microscopic imaging system according to some embodiments of the present disclosure. The imaging device 130 may be configured to receive light to form an image, and the imaging device 130 may include a camera, a video camera, etc. In some embodiments, as shown in FIG. 10, the imaging device 130 may perform microscopic imaging on a sample on the sample carrying device 111. That is, a visible light transmitted through or reflected back from the sample can obtain a magnified image of the tiny sample after passing through one or more lenses.

FIG. 11 is a schematic diagram illustrating the mounting of an imaging device according to some embodiments of the present disclosure. As shown in FIG. 11, in some embodiments, the microscopic imaging system 100 may further include a second mounting block 222 and a connection plate 224. The second mounting block 222 is fixed to the Y platform 220, the first mounting block 223 is slidably arranged on the second mounting block 222, and the connection plate 224 is fixedly arranged on the first mounting block 223. One side of the connection plate 224 is connected to the second mounting block 222 via the first elastic component 226, and the other side of the connection plate 224 is provided with a screw hole for the lens of the imaging device 130 to pass through. The first mounting block 223 is arranged between the imaging device 130 and the first elastic component 226.

The follower structure 150 may be configured to abut against the bottom surface of the sample carrying device 111. The follower frame 140 may be configured to mount the follower structure 150.

In some embodiments, the Z platform 230 and the Z platform moving mechanism may be arranged on the follower structure 150, the follower frame 140 may be arranged on the Y platform 220, and the follower structure 150 may be movably connected to the follower frame 140.

In some embodiments, a top of the follower structure 150 may be abutted against the bottom surface of the sample carrying device 111. In a specific embodiment, the top of the follower structure 150 may be provided with a follower member 225, and the follower member 225 may abut against the bottom surface of the sample carrying device 111. In some embodiments, the imaging device 130 may be arranged on the follower structure 150, and the follower structure 150 may be configured to maintain a distance between the imaging device 130 and the bottom surface of the sample carrying device 111. In some embodiments, when the sample platform 110 moves to the set position, the follower structure 150 may move up and down slightly to ensure a distance between the imaging device 130 and the observed sample, so as to obtain clear and stable imaging.

Merely by way of example, when the imaging device 130 is located directly below one of sample holes of the sample carrying device 111, the Z platform driving portion 231 may control the imaging device 130 to move to an optimal observation position (i.e., a position at which the clear imaging is possible). Further, when it is necessary to observe other holes, the X platform driving portion 211 may drive the X platform 210 to move along the X axis, the Y platform driving portion 221 may drive the Y platform 220 to move along the Y axis, and the Z platform driving portion 231 stops working. One end of the follower member 225 away from the connection plate 224 may always be abutted against the sample carrying device 111. Since the bottom surface of the sample carrying device 111 is not necessarily flat, there may be recesses or bumps in certain positions. When the follower member 225 is located in a recess or a bump, the first elastic component 226 forces the connection plate 224 to move towards or away from the sample carrying device 111. At this time, the connection plate 224, the first mounting block 223, the Z platform driving portion 231, and the imaging device 130 simultaneously move relative to the second mounting block 222.

In some embodiments, through the arrangement of the follower structure 150, it may be ensured that an optimal relative distance is always maintained between the imaging device 130 and the observed sample, thereby ensuring clear imaging and realizing the follower focusing.

Figure 12:
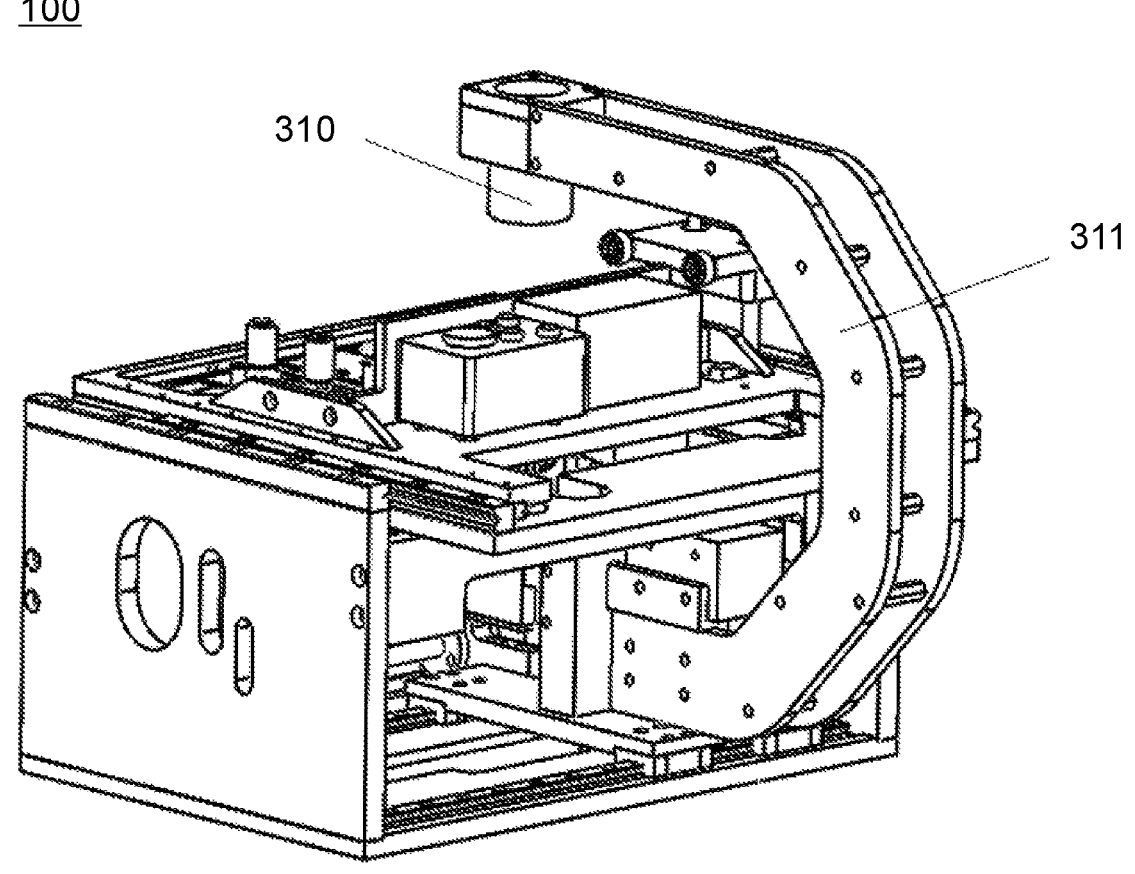
FIG. 12 is a schematic diagram illustrating a structure of a microscopic imaging system according to some embodiments of the present disclosure.

FIG. 12 is a schematic diagram illustrating a structure of a microscopic imaging system according to some embodiments of the present disclosure. As shown in FIG. 12, in some embodiments, the microscopic imaging system 100 may further include a light source device 310, and the light source device 310 may provide a light source based on the imaging requirements of the imaging device 130. In some embodiments, the light source device 310 may be connected to the Y platform 220 or the Z platform 230 via a mounting arm 311, so that the light source device 310 may move following the movement of the imaging device 130 to provide the light source required for imaging.

In some embodiments, the microscopic imaging system 100 may further include a control system. In some embodiments, the control system may include a communication device and a controller, and the communication device may be configured to receive an instruction. The controller may be configured to control the imaging device 130 to perform imaging according to the instruction, and the controller may further be configured to control the sample platform 110, the X platform 210, the Y platform 220, and the Z platform 230 to move according to the instruction, respectively. In some embodiments, the microscopic imaging system 100 may be controlled in according to a manual control instruction of the user. For example, the user may manually control the movement of the sample platform 110, the X platform 210, the Y platform 220, the Z platform 230 and manually control the imaging device 130 to perform imaging, etc.

In some embodiments, the method for controlling the microscopic imaging system 100 may be performed by the control system of the microscopic imaging system 100. In some embodiments, the method may include receiving a movement instruction; and controlling the movement of the sample platform 110, the X platform 210, the Y platform 220, and the Z platform 230 based on the movement instruction. It can be understood that the control system may simultaneously control any one or more of the sample platform 110, the X platform 210, the Y platform 220, and the Z platform 230 to move simultaneously or sequentially as required. In some embodiments, the method may further include receiving an imaging instruction; and controlling the imaging device 130 to perform imaging based on the imaging instruction. It can be understood that the control system may perform the movement instruction and the imaging instruction simultaneously or sequentially as required. Specifically, the control system may control any one or more of the sample platform 110, the X platform 210, the Y platform 220, and the Z platform 230 to move simultaneously or sequentially, and at the same time, control the imaging device 130 to perform one or more imaging.

In some embodiments, the control method may further include receiving an experiment run instruction. The experiment run instruction may include a preset photographing field of view and a moving position parameter.

The photographing field of view refers to a range of a region that can be photographed. In some embodiments, the sample carrying device 111 may include a position samples can be carried, such as a plurality of holes. However, on the one hand, not every position may carry a sample to be photographed, and thus not every position needs to be photographed; on the other hand, a certain position may need to be photographed multiple times. In some embodiments, the photographing field of view may be represented in the form of sequential data, and the photographing field of view may reflect photographing requirement information corresponding to each hole of the sample carrying device 111. For example, sequential data (1, 0, 2, . . . ) means that 1 photograph is taken for the 1st hole, no photograph is taken for the 2 nd hole, 2 photographs is taken for the 3 rd hole, and so on. Thus, to achieve such a photographic process in a single experiment, the X platform 210, or the X platform 220 and the Y platform 230 need to move multiple times.

The moving position parameter includes movement paths and a movement speeds of the X platform 210 and the Y platform 220. The movement path may be in the form of time-sequenced displacements along the X-axis and Y-axis directions. The movement path may be a combination of multiple segments of linear paths along the X-axis direction and the Y-axis direction. The moving speed may include a speed corresponding to each segment of linear paths.

For achieving the same preset photographing field of view, the completion time is different based on different moving position parameters. If the imaging time of the imaging device 130 is constant, some paths with more complex designs or slower moving speed would obviously take longer to complete than others paths, which may prolong the entire experiment time and may also affect the samples (e.g., sample inactivation after too long time, etc.).

In some embodiments, the moving position parameter may be determined in various ways to control the microscopic imaging system 100 to perform experimental operations based on the moving position parameter. For example, the moving position parameter may be determined based on the preset photographing field of view. In some embodiments, the moving position parameter may be determined based on a prediction model. The prediction model may be a machine learning model. For example, the prediction model may include any one or combination of a convolutional neural network (CNN) model, a neural network (NN) model, or other customized model, etc.

In some embodiments, an input of the prediction model may include the preset photographing field of view, and an output of the prediction model may include at least one group of moving position parameters and a corresponding completion time. The preset photographing field of view may be manually input by the user, or the preset photographing field of view may be a default value (e.g., (1, 1, 1 . . . )) determined based on experience. A count of groups of moving position parameters needs to be limited within a threshold range to avoid the prediction model from outputting too many groups of moving position parameters, thereby reducing efficiency. The threshold range may be set manually based on experience.

In some embodiments, the prediction model may be trained based on a large count of labeled training samples. Each of the labeled training samples may include a sample photographing field of view, and the label of the training sample includes sample moving position parameters corresponding to the sample photographing field of view and corresponding completion time. In some embodiments, the labeled training samples may be obtained based on historical data. The labels may be manually labelled.

In some embodiments, the user may select a suitable moving position parameter according to the experimental requirement, thereby generating an experiment run instruction. In some embodiments, the microscopic imaging system 100 may automatically determine moving position parameters corresponding to different experimental requirements based on the output of the prediction model, and the user may directly select from the moving position parameters. For example, the microscopic imaging system 100 may automatically determine a moving position parameter with the shortest completion time and the shortest moving path based on the experimental requirements of the user.

In some embodiments of the present disclosure, the photographing field of view is preset and the moving position parameter and the corresponding completion time are determined by the prediction model, which ensures the rationality of the moving position parameter and the completion efficiency of the experiment, and reduces the user operations and improves the user-friendliness.

Merely by way of example, a user terminal (e.g., a mobile phone, a computer, etc.) may send the experiment run instruction in a wired or wireless manner (e.g., network, Bluetooth, etc.), and the communication device may receive the experiment run instruction. The controller may start to perform the experimental operation based on the preset photographing field of view and the moving position parameter according to the received experiment run instruction.

After the experiment is finished, the controller may send data to the user terminal via the communication device.

Merely by way of example, the user terminal may send the imaging instruction to the imaging device 130 in the wired or wireless manner (e.g., network, Bluetooth, etc.), and the communication device may receive the imaging instruction. The controller may, based on the received imaging instruction, start to perform the photographic operation based on the preset photographing field of view and the moving position parameter. After the photographic operation is finished, the controller may send the data to the user terminal via the communication device.

Merely by way of example, the user terminal may send a movement instruction to the imaging device 130 in the wired or wireless manner (e.g., network, Bluetooth, etc.), and the communication device may receive the movement instruction. The controller may start to perform a movement operation according to the received movement instruction. After the movement is completed, the controller may send a movement completion result to the user terminal via the communication device.

In some embodiments, the microscopic imaging system 100 may be remotely controlled to realize the remote operation of the system, which does not require the operator to operate on site, which is safe and efficient, and improves the operator's comfort.

The basic concept has been described above, obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that references to "one embodiment," "an embodiment" or "an alternative embodiment" two or more times in different places in the present disclosure do not necessarily refer to the same embodiment. In addition, certain features, structures, or characteristics in one or more embodiments of the present disclosure may be properly combined.

Similarly, it should be noted that, in order to simplify the expressions disclosed in this disclosure and thus help the understanding of one or more embodiments, in the foregoing description of the embodiments of this disclosure, various features may sometimes be combined into one embodiment, accompanying drawing or description. However, this disclosure method does not mean that the characteristics required by the object of the present disclosure are more than the characteristics mentioned in the claims. Rather, claimed subject matter may lie in less than all features of a single foregoing disclosed embodiment.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A sample platform control structure comprising a base, an X platform, an X platform moving mechanism, a sample platform, a sample platform moving mechanism, a primary guide rail, and a secondary guide rail, wherein the sample platform is arranged on the X platform, the sample platform being configured to carry a sample carrying device, the sample platform moving mechanism is configured to drive the sample platform to move relative to the X platform via the primary guide rail, the X-platform moving mechanism is configured to drive the X-platform to move relative to the base via the secondary guide rail, the primary guide rail and the secondary guide rail have different accuracies, the X platform moving mechanism and the sample platform moving mechanism have different control accuracies, and an effective stroke of the primary guide rail is L1, an effective stroke of the secondary guide rail is L2, a length of the secondary guide rail is L3, the L1, the L2, and the L3 meeting a condition: $L3 < L1 + L2 < 2L3$.

2. The sample platform control structure of claim 1, wherein the X platform moving mechanism includes an X platform driving portion, the X platform driving portion being arranged on the base, the X platform driving portion being driveably connected to the X platform, the secondary guide rail being arranged between the X platform and the base, and the X platform driving portion being configured to drive the X platform to move relative to the base via the secondary guide rail, the sample platform moving mechanism includes a sample platform driving portion, the sample platform driving portion being arranged on the sample platform, the primary guide rail being arranged between the X platform and the sample platform, the sample platform driving portion being configured to drive the sample platform to move relative to the X platform via the primary guide rail, and/or, the sample platform moving mechanism further includes a position sensor, the position sensor being configured to detect that the sample platform reaches a set position.

3. The sample platform control structure of claim 2, wherein the primary guide rail is a linear guide rail, and the secondary guide rail is a cross guide rail.

4. The sample platform control structure of claim 1, wherein the sample platform control structure is applied in a platform mechanism of a microscopic imaging system.

5. The sample platform control structure of claim 4, wherein the platform mechanism includes a Y platform and a Y platform moving mechanism, the Y platform being slidingly connected to the base, the Y platform moving mechanism being configured to drive the Y platform to move along a Y axis relative to the base.

6. The sample platform control structure of claim 5, wherein the X platform and the Y platform are not in a same plane.

7. The sample platform control structure of claim 5, wherein the platform mechanism further includes a Z platform and a Z platform moving mechanism, the Z platform and the Z platform moving mechanism being arranged on the Y platform, the Z platform being arranged perpendicularly to the Y platform, the Z platform moving mechanism being configured to drive the Z platform to move along a Z axis.

8. The sample platform control structure of claim 7, wherein the platform mechanism further includes an imaging device, the imaging device being arranged on the Z platform, the imaging device being arranged below the sample carrying device.

9. A microscopic imaging system including a sample platform control structure or a platform mechanism, wherein
the sample platform control structure including a base, an X platform, an X platform moving mechanism, a sample platform, a sample platform moving mechanism, a primary guide rail, and a secondary guide rail, wherein
the sample platform is arranged on the X platform, the sample platform being configured to carry a sample carrying device,
the sample platform moving mechanism is configured to drive the sample platform to move relative to the X platform via the primary guide rail,
the X-platform moving mechanism is configured to drive the X-platform to move relative to the base via the secondary guide rail,
the primary guide rail and the secondary guide rail have different accuracies,
the X platform moving mechanism and the sample platform moving mechanism have different control accuracies,
an effective stroke of the primary guide rail is L1, an effective stroke of the secondary guide rail is L2, and a length of the secondary guide rail is L3, the L1, the L2, and the L3 meeting a condition: L3<L1+L2<2L3,
the platform mechanism includes a Y platform and a Y platform moving mechanism, the Y platform being slidingly connected to the base, the Y platform moving mechanism being configured to drive the Y platform to move along a Y axis relative to the base.

10. The microscopic imaging system of claim 9, wherein the X platform moving mechanism, the Y platform moving mechanism, and the Z platform moving mechanism include sensors respectively include sensors, the sensors being configured to detect displacements of the X platform, the Y platform, and the Z platform, respectively,
the Y platform moving mechanism includes a Y platform driving portion, the Y platform being provided with a slider, the base being provided with a slide rail, the Y platform driving portion driving the Y platform to move along the Y axis relative to the base through a cooperation between the slider and the slide rail, and/or,
the Z platform moving mechanism includes a Z platform driving portion and a first mounting block, the Z platform driving portion being fixed to the first mounting block, the Z platform is slidably arranged on the first mounting block, the Z platform driving portion drives the Z platform to move relative to the first mounting block.

11. The microscopic imaging system of claim 10, wherein the Z platform moving mechanism further includes a second mounting block and a connection plate, the second mounting block being fixed to the Y platform, the first mounting block is slidably arranged on the second mounting block along the Z axis, the connection plate being fixedly arranged on the first mounting block, one side of the connection plate being connected to the second mounting block by a first elastic component, the other side of the connection plate is provided with a screw hole for a lens of the imaging device to pass through, the first mounting block is arranged between the imaging device and the first elastic component.

12. The microscopic imaging system of claim 9, wherein
the microscopic imaging system includes a follower structure and a follower frame, the Z platform and the Z platform moving mechanism being arranged on the follower structure, the follower frame being arranged on the Y platform, the follower structure being movably connected to the follower frame, a top end of the follower structure being abutted against a bottom surface of the sample carrying device, the follower structure being configured to maintain a distance between the imaging device and the bottom surface of the sample carrying device, and/or,
the microscopic imaging system further includes a fixing device, the fixing device being in rolling contact with the sample carrying device.

13. The microscopic imaging system of claim 12, wherein the microscopic imaging system further includes a guide shaft, the guide shaft being vertically arranged on the base or the X platform, the fixing device includes a press block, the guide shaft being movably passes through the press block, an end of the guide shaft away from the base being provided with a locking member, the guide shaft being sleeved with a second elastic component, one end of the second elastic component being abutted against the press block, the other end of the second elastic component being abutted against the locking member.

14. The microscopic imaging system of claim 13, wherein the microscopic imaging system further includes a pressure sensor configured to detect a pressure of the second elastic component.

15. The microscopic imaging system of claim 9, wherein the sample platform is provided with a guide block, the fixing device being capable of being rolled along the guide block.

16. The microscopic imaging system of claim 15, wherein an extension direction of the guide block is in a same direction as a rolling direction of the fixing device, the guide block having a trapezoidal shape in a direction perpendicular to the extension direction of the guide block.

17. The microscopic imaging system of claim 15, wherein both a count of the guide block and a count of the fixing device are two, the guide block and the fixing device being arranged on two sides of the sample carrying device.

18. The microscopic imaging system of claim 9, wherein
the microscopic imaging system includes a control system, the control system including a controller, the controller being configured to control movements of the sample platform, the X platform, the Y platform, and the Z platform, respectively, and an imaging of the imaging device.

19. A method for controlling a microscopic imaging system, wherein
the method is performed by the microscopic imaging system, the microscopic imaging system including a sample platform control structure and a platform mechanism, the sample platform control structure including a base, an X platform, an X platform moving mechanism, a sample platform, a sample platform moving mechanism, a primary guide rail, and a secondary guide rail, wherein the sample platform is arranged on the X platform, the sample platform being configured to carry a sample carrying device, the sample platform moving mechanism is configured to drive the sample platform to move relative to the X platform via the primary guide rail, the primary guide rail and the secondary guide rail have different accuracies, the X platform moving mechanism and the sample platform moving mechanism have different control accuracies, the X-platform moving mechanism is configured to drive the X-platform to move relative to the base via the secondary guide rail, an effective stroke of the primary guide rail is L1, an effective stroke of the secondary guide rail is L2, and a length of the secondary guide rail is L3, the L1, the L2, and the L3 meeting a condition: $L3 < L1 + L2 < 2L3$, the platform mechanism including a Y platform and a Z platform, and the method including:

receiving a movement instruction, and controlling a movement of the sample platform, the X platform, the Y platform, and/or the Z platform based on the movement instruction; and/or receiving an imaging instruction, and controlling the imaging device to perform imaging based on the imaging instruction.

20. The method of claim 19, wherein the method comprises:

controlling a movement of the sample platform through the sample platform moving mechanism when mounting/replacing a sample on the sample platform; and controlling a movement of the X platform through the X platform moving mechanism when microscopic imaging the sample.

* * * * *